(12) United States Patent
Hikmet et al.

(10) Patent No.: US 12,337,527 B2
(45) Date of Patent: Jun. 24, 2025

(54) FDM PRINTED LUMINAIRES WITH ENHANCED SHINY APPEARANCE

(71) Applicant: SIGNIFY HOLDING B.V., Eindhoven (NL)

(72) Inventors: Rifat Ata Mustafa Hikmet, Eindhoven (NL); Ties Van Bommel, Horst (NL); Stefan Willi Jukius Gruhlke, Baesweiler (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 256 days.

(21) Appl. No.: 17/779,313

(22) PCT Filed: Nov. 16, 2020

(86) PCT No.: PCT/EP2020/082286
§ 371 (c)(1),
(2) Date: May 24, 2022

(87) PCT Pub. No.: WO2021/104920
PCT Pub. Date: Jun. 3, 2021

(65) Prior Publication Data
US 2022/0410468 A1   Dec. 29, 2022

(30) Foreign Application Priority Data
Nov. 26, 2019   (EP) ..................... 19211550

(51) Int. Cl.
*B29C 64/118*   (2017.01)
*B29L 31/00*   (2006.01)
(Continued)

(52) U.S. Cl.
CPC ............ *B29C 64/118* (2017.08); *B33Y 10/00* (2014.12); *B33Y 70/10* (2020.01); *B33Y 80/00* (2014.12);
(Continued)

(58) Field of Classification Search
CPC .................. B29K 2995/003; B29C 64/118
See application file for complete search history.

(56) References Cited

U.S. PATENT DOCUMENTS

2019/0210278 A1   7/2019   Hikmet et al.
2022/0154023 A1*  5/2022   Discekici ............... B33Y 40/10

FOREIGN PATENT DOCUMENTS

CN     107531935 A     1/2018
WO     2017014784 A1   1/2017
(Continued)

Primary Examiner — John J DeRusso

(57) ABSTRACT

Provided is a method for producing a 3D item using fused deposition modelling, the method comprising a 3D printing stage comprising: layer-wise depositing an extrudate comprising 3D printable material, to provide the 3D item comprising 3D printed material, wherein the 3D item comprises a plurality of layers of 3D printed material having a core-shell 3D printable material, wherein the core material comprises a core thermoplastic material and core additive material, wherein the shell material comprises a shell thermoplastic material and shell particles, wherein the shell material is light transmissive, wherein the shell particles comprise specularly reflective particles, wherein the core additive material comprises one or more of diffuse reflective particles, white particles, black particles, colored particles, and dye molecules, and wherein the core material and shell material differ in one or more optical properties selected from the group of color, reflectivity, type of reflectivity, and absorption of light.

13 Claims, 11 Drawing Sheets

(51) Int. Cl.
  *B33Y 10/00* (2015.01)
  *B33Y 70/10* (2020.01)
  *B33Y 80/00* (2015.01)
  *F21V 1/22* (2006.01)
  *F21V 1/26* (2006.01)

(52) U.S. Cl.
  CPC .................. *F21V 1/22* (2013.01); *F21V 1/26* (2013.01); *B29K 2995/002* (2013.01); *B29K 2995/003* (2013.01); *B29L 2031/7472* (2013.01)

(56) References Cited

FOREIGN PATENT DOCUMENTS

| WO | 2018054724 A1 | 3/2018 |
| WO | 2018210602 A1 | 11/2018 |
| WO | 2018224395 A1 | 12/2018 |
| WO | 2019002120 A1 | 1/2019 |

\* cited by examiner

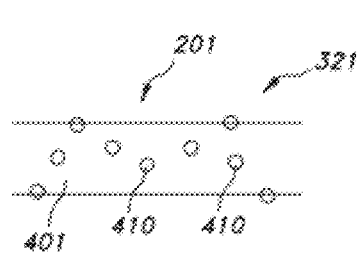
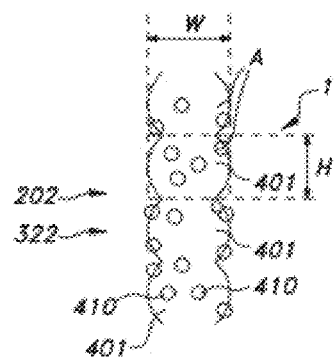
FIG. 3A  FIG. 3B
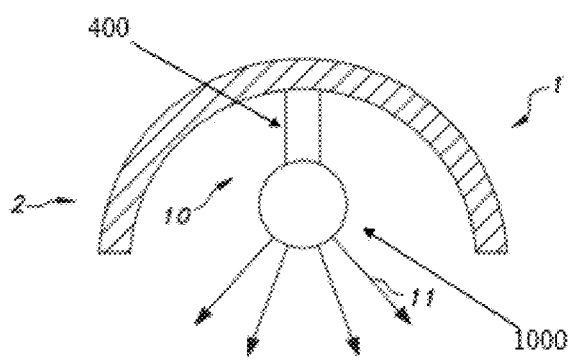
FIG. 4

FDM PRINTED LUMINAIRES WITH ENHANCED SHINY APPEARANCE

CROSS-REFERENCE TO PRIOR APPLICATIONS

This application is the U.S. National Phase application under 35 U.S.C. § 371 of International Application No. PCT/EP2020/082286, filed on Nov. 16, 2020, which claims the benefit of European Patent Application No. 19211550.9, filed on Nov. 26, 2019. These applications are hereby incorporated by reference herein.

FIELD OF THE INVENTION

The invention relates to a method for manufacturing a 3D (printed) item. Further, the invention relates to a software product for executing such method. The invention also relates to the 3D (printed) item obtainable with such method. The invention further relates to a filament for 3D printing. Further, the invention relates to a lighting device including such 3D (printed) item. Yet further, the invention may also relate to a 3D printer, such as for use in such method.

BACKGROUND OF THE INVENTION

The use of particles comprising light reflective material in 3D printing is known in the art.

WO2018/054724 describes a method for 3D printing a 3D item, the method comprising providing a filament of 3D printable material ("printable material") and printing during a printing stage said 3D printable material on a substrate, especially with a fused deposition modeling (FDM) 3D printer, to provide said 3D item, wherein the printing stage comprises (a) providing a layer comprising particles on the substrate, wherein the particles have a main axis having a main axis length, and a minor axis having a minor axis length, wherein the main axis length (LI) and the minor axis length have a first aspect ratio larger than 1, especially at least 5, wherein especially in average the main axes of said particles are configured parallel to a tangential plane to the substrate, wherein in specific embodiments said particles comprise light reflective material, and (b) printing said 3D printable material on said layer on the substrate to provide said 3D item comprising said layer. Especially, the particles are flakes.

WO2018/224395 describes a method for 3D printing an optical component that has a plurality of layers, each of which has a core portion and a shell portion enveloping the core portion. The core portion is made of a first material and the shell portion is made of a second material, wherein the first material and the second material have a different transmissivity.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable, and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

It appears desirable to be able to 3D print items which may be reflective for visible light. Further, it may be desirable to be able to tune such reflective properties. Hence, it is an aspect of the invention to provide an alternative 3D printing method and/or 3D (printed) item which preferably further at least partly obviate(s) one or more of above-described drawbacks, and/or an aspect to overcome or ameliorate at least one of the disadvantages of the prior art, and/or to provide a useful alternative.

For obtaining metallic appearance use of metal flakes have been suggested. Commercially available aluminum flakes are so-called corn flakes with an irregular shape or so-called dollar flakes which are round. However, these flakes have matte surfaces and when printed they look rather gray without any specular reflecting component. In order to obtain more metallic appearance pure metal glitters can be used. Such glitters are particles of precision cut aluminum foil. As opposed to metal flakes, these pure metal glitters may show specular reflection and have a metallic appearance. They differ from glitters where sub-micron thick aluminum layer is deposited on a polymeric carrier as they can be processed at elevated temperatures such that they can be included in polymers such as polycarbonate with ease. Pure metal glitters may in embodiments have a thickness of at least 2 micrometer and length-width dimensions of in embodiments at least 50×50 micrometer. It is also possible to use glass flakes coated with silver/aluminum. It was observed that when these pure aluminum metal glitters and/or specularly reflecting glass flakes are used in a mixture with flakes which show only diffuse reflection an enhanced metallic look is obtained.

Hence, in a first aspect the invention provides a method for producing a 3D item by means of fused deposition modelling. Especially, the method comprises a 3D printing stage, wherein the 3D printing stage comprises layer-wise depositing an extrudate comprising 3D printable material, to provide the 3D item ("3D printed item") comprising 3D printed material. Especially, 3D printing may be done on a receiver item. In embodiments, the 3D item may comprise a plurality of layers of 3D printed material. In specific embodiments, the 3D printable material comprises core-shell 3D printable material comprising (i) a core comprising core material (or "core component") and (ii) a shell comprising shell material (or "shell component"). In yet further specific embodiments, the core material comprises a thermoplastic material, indicated as "core thermoplastic material" and core additive material. Alternatively or additionally, in specific embodiments the shell material comprises a thermoplastic material, indicated as "shell thermoplastic material", and shell particles (which may also be indicated as "particulate material"). In further specific embodiments, the shell material is light transmissive for one or more wavelengths in the visible wavelength range. Further, especially the core material and shell material differ in one or more optical properties selected from the group of color, reflectivity, type of reflectivity, and absorption of light.

Hence, in specific embodiments the invention provides a method for producing a 3D item by means of fused deposition modelling, the method comprising a 3D printing stage comprising: layer-wise depositing an extrudate comprising 3D printable material, to provide the 3D item comprising 3D printed material, wherein the 3D item comprises a plurality of layers of 3D printed material, wherein the 3D printable material comprises core-shell 3D printable material comprising (i) a core comprising core material and (ii) a shell comprising shell material, wherein the core material comprises a core thermoplastic material and core additive material, wherein the shell material comprises a shell thermoplastic material and shell particles, wherein the shell material is light transmissive for one or more wavelengths in the visible wavelength range, wherein the shell particles (252) comprise specularly reflective particles, wherein the core additive material (242) comprises one or more of diffuse reflective particles, white particles, black particles, colored particles, and dye molecules, and wherein the core material and shell material differ in one or more optical properties selected from the group of color, reflectivity, type of reflectivity, and absorption of light. The term "absorption of light" especially refers to the absorption of one or more wavelengths in the visible wavelength range, which is especially defined as 380-780 nm. Due to absorption of light, the core or shell (or optionally both) may be colored or grey or black (note however that the shell is light transmissive). As the shell is light transmissive, the core may be perceived through the shell.

It appears that with the core-shell structure, enhanced optical properties can be obtained. For instance, specular reflective material in the shell may provide a more (specular) reflective appearance when diffuse reflective or light absorbing material in the core is applied. As indicated above, it was observed that when e.g. pure aluminum metal glitters and/or specularly reflecting glass flakes are used in a mixture with flakes which show only diffuse reflection an enhanced metallic look is obtained. However, it also appears that the appearance may be further enhanced when polymer carrying the particles are physically separated.

Here below, first some aspects in relation to the core-shell material is described. General aspects in relation to 3D printing, such as 3D printable material and 3D printed material, etc., are discussed further below.

As indicated above, the 3D printable material comprises core-shell 3D printable material. The core-shell 3D printable material may be provided as such, i.e. a filament of core-shell material. Alternatively, a nozzle may be applied for printing two 3D printable material in a core-shell configuration, by which core-shell 3D printable material escapes from the nozzle and is deposited as 3D printed material. Such nozzle may also be indicated as "core-shell nozzle". In this way, the extrudates comprises core-shell 3D printable material which is deposited. The deposited material is herein indicated as 3D printed material (i.e. herein core-shell 3D printable material 3D printed material).

Note that the 3D printed item may comprise layers that are core-shell, as defined herein, or may comprise layer parts that are core-shell as defined herein. All layers may be entirely of the type core-shell, or one or more layers, or parts of one or more layers may be of the type core-shell.

As will be further elucidated below, the 3D printable material (and thus in general also the 3D printed material) comprises a thermoplastic material. Hence, especially both the core material and the shell material may comprise thermoplastic material. Further, in order to provide the optical effects, the core material and the shell material comprise particulate materials, respectively. Hence, in embodiments the core-shell 3D printable material comprises (i) a core comprising core material and (ii) a shell comprising shell material. Especially, the core material comprises a core thermoplastic material and core additive material. Further, especially the shell material comprises a shell thermoplastic material and shell particles.

The thermoplastic materials of the core and the shell may be different or the same. The thermoplastic materials of the core and/or the shell may comprise combinations of thermoplastic materials, respectively, wherein the core and the shell may have one or more thermoplastic materials in common. In specific embodiments, the thermoplastic material of the core and of the shell are essentially the same. Hence, in embodiments the thermoplastic materials of the core and of the shell may essentially have the same chemical compositions. For instance, both may comprise or essentially consist of e.g. PE or PP, PC, PET, PS, PMMA etc. (see also below).

Especially, the shell material is light transmissive for one or more wavelengths in the visible wavelength range. For instance, shell material may be transmissive for blue, green, yellow, orange, or red light. Therefore, at least part of the core may be visible (to the human eye) through (at least part of) the shell.

Further, the shell material may also be partially transmissive for one or more colors so as to have a color in the transmissive state. In other words, it may absorb one or more colors and transmit the rest. It may also be color neutral and absorb in the visible range and partly transmit white light so as to have grey levels.

Especially, the shell material may be transmissive for at least part of the visible light. Yet more especially, the shell material is at least partly transparent. Hence, the shell material, more especially the thermoplastic material and the particulate material, may be selected such that the shell material is transmissive. For instance, the thickness of the shell, the dimensions of the shell particles, as well as the volume percentage of the shell particles may be chosen that shell is transmissive for one or more wavelengths in the visible light. Especially, the transmission for one or more wavelengths in the visible may be at least 30%, such as at least 60%. Even more especially, over the visible wavelength range of 380-780 nm, the average light transmission may be at least 30%, such as at least 60%. Transmission may be measured under perpendicular radiation with visible light of the layer, or of an identical layer but on a substrate.

Especially, the size and the separation of the shell particles may in embodiments be within the resolution of the eye. In addition to shell particles, the shell may also contain (non-particulate) light absorbing materials. Especially, the light absorbing materials may be (sub) nano sized (dye molecules) for giving uniform (colored (such as white) or black) background. Therefore, in embodiments the shell material and shell thickness, including (dye) additions, may especially be chosen such that the shell is transmissive for one or more wavelengths in the visible.

The shell material may also contain light scattering particles. In embodiments, light scattering particles may not induce more than 20% back reflection. Hence, as the shell is transmissive for light, the core may at least partly be visible. Hence, the core is at least partly visible (through the shell).

In embodiments, the layer thickness of the shell may be selected from the range of 5-500 µm, such as selected from the range of 50-200 µm. The volume percentage of the shell particles relative to the shell material may be selected from the range of 0.1-10 vol. %, such as especially 0.5-5 vol. %. The relatively low volume percentage may also facilitate a homogeneous distribution of the shell particles over the shell material. Especially, the shell material may thus always comprise shell particles and may optionally (further) comprise a light absorbing additive. In embodiments, the volume percentage of core particles in the core material may be higher than the shell particles in the shell material. In embodiments, the volume percentage of the core particles may be at least 2 vol. %, especially at least 5 vol. %, such as at least 10 vol. %, such as up to about 30 vol. %. Note however that in addition or alternative to core particles, the core material may include a dye.

Especially, the core material (especially in embodiments the core particles) and shell material (especially in embodiments the shell particles) differ in one or more optical properties selected from the group of color, reflectivity, type of reflectivity, and absorption of light. Here, in the term "color" any color may be meant, and also black and white may be included as "colors".

Hence, when differing in color, e.g. core additive material and/or e.g. dye may be black, and shell particles may be colored (one or more colors). In such a case, where the core essentially may provide a black background, and the shell may comprise (specularly) reflective particles, this may provide a colored spotty appearance.

Or, core additive material may be black or white, and shell particles may be metallic, with in embodiments diffuse or specular reflection. Or core might have the color blue and shell particles have a diffuse reflective color of yellow. Or, in embodiments the core material may comprise a dye. Such dye may be molecularly dispersed in the thermoplastic material. Pigment particles, which may be black, white, or have (another) color may thus also be applied in the core.

When differing in reflectivity, the core additive material may be more or less reflective than the shell particles. Alternatively or additionally, they may differ in directional reflectivity. In specific embodiments, the shell particles may be diffuse metallic reflective, and the core additive material may be specularly reflective. However, especially in yet other embodiments the shell particles may be specularly reflective, and the core additive material, especially core particles, may be diffuse reflective. At least, in specific embodiments the shell comprises specular reflective particles and the core comprises one or more of (i) particles that absorb and or reflect, but which are essentially not specular reflective, and (ii) a dye.

The reflectivity of the particles may be measured or defined as bulk property. For instance, a thick layer of particulate material may be provided of which the reflectivity under perpendicular radiation with one or more wavelengths of the visible light may be defined. When differing in type of reflectivity, particles of the shell may e.g. be specular reflective, and of the core may be diffuse reflective. Directional reflectivity may be different when so-called reflective holographic particles which give rise to diffraction are used. The reflectivity of the particles may especially be defined on the level of the particles. E.g. plate-like particles, especially with a layer of metal with a smooth surface, such as silver or aluminum, may provide specular reflection whereas particles with a rough surface such as dollar flakes wrinkled particles may provide diffuse reflection.

Hence, in embodiments the core additive material may comprise metal particles. In embodiments, the metal particles are wrinkled. In embodiments, the metal particles have a (rough) diffuse reflecting surface.

In embodiments, core additive material comprise particles having a symmetrical shape, such as a sphere, or an irregular shape.

In specific embodiments, the core may have a uniform color while shell particles in the shell are homogeneously distributed (like individual particles or in clusters separated from each other); this may provide a spotty appearance.

The core additive material comprises one or more of diffuse reflective particles, white particles, black particles, colored particles, and dye molecules. As indicated above, the shell particles may especially comprise specularly reflective particles. Hence, the core additive material may be reflective and/or light absorbing. The core additive material may comprise particles, like pigment particles. Alternatively or additionally, the core additive material may comprise dyes. In very specific embodiments, the dyes may be luminescent dyes.

The shell particles comprise specularly reflective particles. Such particles may be used to provide a sparkling appearance to the 3D item. This may e.g. be used to create a desirable appearance, to distribute light, metallic appearance etc. . . . For instance, in embodiments such shell particles may comprise one or more of polymeric flake-like particles having a metal coating and glass flakes with a smooth metal coating showing specular reflection. In yet further specific embodiments, the shell particles may comprise (crystalline) polyethylene terephthalate flake-like particles having an aluminum coating or a silver coating. In embodiments, the polyethylene terephthalate may be biaxially oriented. The thickness of carrier polymer may be in the range of 10-100 µm. The thickness of aluminum layer may be selected from the range of e.g. 10-60 nm. In yet other embodiments, the shell may contain specularly reflecting plate-like metal particles, which may in further embodiments have a thickness selected from the range of about 2-10 µm.

In specific embodiments, at least one of the dimensions of the shell particles are selected from the range of 2 µm to 5 mm. Especially, this may apply to the largest dimension. However, this may also apply to two or more of the dimensions. Hence, in specific embodiments the shell particles have one or more dimensions selected from the particle length (L1), the particle height (L2), and the particle width (L3), having a length selected from the range of equal to and larger than 2 µm and equal to or smaller than 5 mm. Especially, such dimension(s) may be selected from the range of 4µ-2 mm.

When differently light particles are applied (for shell particles and/or core particles), the (respective shell and core) dimensions L1, L2 and L3 may refer to number averaged dimensions.

In specific embodiments, the shell particles comprises glitter particles with various shapes such as rectangular, hexagonal, circular, etc. They can be made of materials described above. For instance, the shell particles may comprise (crystalline) polyethylene terephthalate flake-like particles having an aluminum coating or a silver coating. They may also be so-called holographic glitters.

In specific embodiments, the shell particles may comprise one or more of (i) polymeric flake-like particles having a metal coating or a metal oxide coating, (ii) glass flakes having a metal coating or a metal oxide coating, (iii) metal flakes, (iv) mica particles having a metal coating or a metal oxide coating, (v) holographic glitter particles, and (vi) colored reflective particles. Further, in specific embodiments optionally the shell material may further comprise a dye.

In embodiments, the dopant material (especially in the shell) may comprise flake-like particles having a particle length (L1) and a particle height (L2) with an aspect ratio of L1/L2 of at least 5, such as at least 10, like e.g. selected from the range of 10-1000. Hence, in specific embodiments. Hence, in embodiments the dopant material may comprise flake-like particles having a particle length (L1) and a particle height (L2) with an aspect ratio of L1/L2 of at least 5, and wherein the method comprises printing one or more layers of the 3D printed material having a layer height (H), wherein in embodiments the layer height (H) is larger than the particle length (L1). This larger layer height may especially be useful when the layers are stacked. Such larger layer height appears to add to the reflective appearance. Further, flake-like particles may have a particle width (L3) with an aspect ratio of L3/L2 of at least 5, such as at least 10, like e.g. selected from the range of 10-1000. In embodiments, L1/L3 may be selected from the range of at least about 10, such as at least about 5. In embodiments, also L3/L1 may be selected from the range of at least about 10, such as at least about 5.

Hence, in embodiments the shell particles have a particle length (L1), a particle height (L2), and a particle width (L3) with an aspect ratio of L1/L2 of at least 5, and L3/L2 of at least 5, and wherein the method comprises printing one or more layers of the 3D printed material having a layer height (H), wherein the layer height (H) is larger than the particle length (L1), and wherein the layers are stacked.

The term "dopant material" herein especially refers to particles that can be used as core additive material or as shell particles. The term "dopant material" is used to refer to the particles in general. The terms "core additive material" or "shell particles", and similar terms, refer to the specific types of particles that are used in the core or shell, respectively.

In specific embodiments, the shell particles may comprise polyethylene terephthalate flake-like particles (which may also be indicated as "glitters") having a metal coating, especially an aluminum coating or a silver coating. Such coatings may be used to provide specular reflective particles. Especially, the shell particles may comprise crystalline polyethylene terephthalate flake-like particles. Herein, the term "crystalline" in relation to polymers may also refer to "semi-crystalline".

Alternatively or additionally, in another specific embodiment, the shell particles may comprise glass particles coated with specular reflecting metal such as silver (or aluminum).

The particles, such as glass particles, may further comprise a color providing additive metal oxide or (other) pigment, to give particles a colored appearance.

In the shell, due to the relatively low content, the particles and/or clusters of them are separated from each other to give spotty appearance. Hence, due to the fact that the particles from the shell are separated from the particles of the core, the particles of the shell may provide a spotty appearance.

Especially, the particles in the shell are (essentially) homogeneously distributed.

In specific embodiments, the core additive material may comprise diffuse reflective particles, such as diffuse reflecting aluminum dollar flakes, which may in specific embodiment be uniformly distributed within the core. It appears that the combination of diffuse reflective particles in the core and specular reflective particles in the shell improve the (specular) metallic appearance.

In specific embodiments, the core additive material comprise flake-like particles, especially having a rough surface, such as so called dollar or corn flakes, which may be made of a metal such as aluminum, copper etc., and which show diffuse reflection. The aluminum surface may be provided by aluminum flake-like particles, or by flake-like particles having an aluminum coating.

In embodiments, the core additive material may comprise one or more of $Al_2O_3$, $TiO_2$, one or more (other) pigments, a dye, dollar shaped flakes, etc. etc.

As indicated above, the core additive material may in embodiments comprise "core particles" or "core additive particles".

The core additive particles may essentially have any shape.

In further specific embodiments, (assuming particles) the core additive material have a particle length (L1) and a particle height (L2) with an aspect ratio of L1/L2 of at least 3. In other embodiments, however, the core additive material have a particle length (L1) and a particle height (L2) with an aspect ratio of L1/L2 of at maximum 3.

Further, (assuming particles) in embodiments the core additive material have a particle width (L3) and a particle height (L2) with an aspect ratio of L3/L2 of at maximum 10, like at maximum 3, like e.g. selected from the range of 1-10. In other embodiments, however, the core additive material have a particle width (L3) and a particle height (L2) with an aspect ratio of L3/L2 of at least 3, like at least 10, like e.g. selected from the range of 10-1000.

In embodiments, (assuming particles) L1/L3 may be selected from the range of at least about 5, such as at least about 10. However, in alternative embodiments (assuming particles) L3/L1 may be selected from the range of at least about 5, such as at least about 10.

Hence, in embodiments the shell particles have a particle length (L1), a particle height (L2), and a particle width (L3) with an aspect ratio of L1/L2 of at least 3, and L3/L2 of at least 3. Note that the dimensions (L1, L2, L3, respectively) of the shell particles and core additive material are not necessarily the same.

In specific embodiments the core may contain particles which are not asymmetric but have shapes such as a sphere or irregular particles.

Especially, the core additive material are uniformly distributed.

In embodiments, in this way the core may thus have a metallic appearance.

Further, it also appears that the (specular) reflective appearance may be promoted by including white reflective particles or black (absorbing) particles in the core. Hence, in specific embodiments the core additive material comprise one or more of (i) diffusively reflecting white particles, such as $TiO_2$, and (ii) black absorbing particles such as carbon or dyes and pigment absorbing other colors.

In specific embodiments, the thermoplastic material of the core may also be comprise a dye. In this way, the core may have a colored appearance which may be visible through the shell. In specific embodiments, the core can also have a colored appearance which can be obtained when dye or pigment added to a white diffuse reflecting mixture is applied.

Especially, the particles in the core are (essentially) homogeneously distributed.

As indicated above, the invention provides a method for producing a 3D item by means of fused deposition modelling, the method comprising a 3D printing stage comprising layer-wise depositing an extrudate comprising 3D printable material, to provide the 3D item comprising 3D printed material (on a receiver item, wherein the 3D item comprises layers of 3D printed material. Further aspect in relation to these features are also elucidated below. Here, 3D printable material and 3D printed material are discussed in general, and may refer to the shell 3D printable material or core 3D printable material, or to both.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature $(T_g)$ and/or a melting point $(T_m)$, and the printer head action comprises heating the 3D printable material above the glass transition and if it is a semi-crystalline polymer above the melting temperature. In yet another embodiment, the 3D printable material comprises a (thermoplastic) polymer having a melting point $(T_m)$, and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing during a printing stage said 3D printable material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. . . . Optionally, the 3D printable material comprises a 3D printable material selected from the group consisting of Urea formaldehyde, Polyester resin, Epoxy resin, Melamine formaldehyde, thermoplastic elastomer, etc. . . . Optionally, the 3D printable material comprises a 3D printable material selected from the group consisting of a polysulfone. Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) comprise one or more of polycarbonate (PC), polyethylene (PE), Low-density polyethylene (HDPE), polypropylene (PP), polyethylene naphthalate (PEN), styrene-acrylonitrile resin (SAN), polysulfone (PSU), polyphenylene sulfide (PPS), and semi-crystalline polyethylene terephthalate (PET), (PMMA), polystyrene (PS), and styrene acrylic copolymers (SMMA). Especially, 3D printable material of the shell comprises one or more translucent polymers (or transparent polymers).

The term 3D printable material is further also elucidated below, but especially refers to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, mechanical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol. %, relative to the total volume of the printable material (including the (anisotropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. . . . Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. . . . Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material is deposited, by which the 3D printed item is generated (during the printing stage). The 3D printed item may show a characteristic ribbed structures (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one or more post processing actions may be executed after removing the printed item from the receiver item. Post processing may include e.g. one or more of polishing, coating, adding a functional component, etc. . . . Post-processing may include smoothening the ribbed structures, which may lead to an essentially smooth surface.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein.

Hence, in an aspect the invention (thus) provides a software product, which, when running on a computer is capable of bringing about (one or more embodiments of) the method (for producing a 3D item by means of fused deposition modelling) as described herein.

Referring to the extrudate (also indicated above), in this invention the extrudate is especially a core-shell extrudate. When deposited, it is a core-shell layer. Hence, especially the method may further comprise using a core-shell filament of 3D printable material or using a core-shell nozzle for creating the extrudate. In both ways, a core-shell extrudate can be created.

Further, as indicated above the core material and shell material may differ in one or more optical properties selected from the group of color, reflectivity, type of reflectivity, and absorption of light. Even more especially, the core additive material and shell particles differ in one or more optical properties selected from the group of color, reflectivity, type of reflectivity, and absorption of light. In specific embodiments, the core particles and shell particles differ in one or more optical properties selected from the group of color, reflectivity, type of reflectivity, and absorption of light.

In yet a further aspect, the invention also provides a core-shell filament comprising (i) a core comprising core material and (ii) a shell comprising shell material, wherein the core material comprises a core thermoplastic material and core additive material, wherein the shell material comprises a shell thermoplastic material and shell particles, wherein the shell material is light transmissive for one or more wavelengths in the visible wavelength range, wherein the shell particles (252) comprise specularly reflective particles, wherein the core additive material (242) comprises one or more of diffuse reflective particles, white particles, black particles, colored particles, and dye molecules, and wherein the core material and shell material differ in one or more optical properties selected from the group of color, reflectivity, type of reflectivity, and absorption of light. It is further referred to the embodiments described above and/or below.

The herein described method provides 3D printed items. Hence, the invention also provides in a further aspect a 3D printed item obtainable with the herein described method. In a further aspect a 3D printed item obtainable with the herein described method is provided. Especially, the invention provides a 3D item comprising 3D printed material. Especially, the 3D item comprises a plurality of layers of 3D printed material. As can be derived from the above, especially the 3D printed material comprises core-shell 3D printed material comprising (i) a core comprising core material and (ii) a shell comprising shell material. In specific embodiments, the core material comprises a core thermoplastic material and core additive material, and the shell material comprises a shell thermoplastic material and shell particles. Further, especially the shell material may be a translucent material and light transmissive for one or more wavelengths in the visible wavelength range. As indicated above, in specific embodiments the core material and shell material may differ in one or more optical properties selected from the group of color, reflectivity, type of reflectivity, and absorption of light.

Hence, especially in embodiments the invention provides a 3D item comprising 3D printed material, wherein the 3D item comprises a plurality of layers of 3D printed material, wherein the 3D printed material comprises core-shell 3D printed material comprising (i) a core comprising core material and (ii) a shell comprising shell material, wherein the core material comprises a core thermoplastic material and core additive material, wherein the shell material comprises a shell thermoplastic material and shell particles, wherein the shell material is light transmissive for one or more wavelengths in the visible wavelength range, wherein the shell particles (252) comprise specularly reflective particles, wherein the core additive material (242) comprises one or more of diffuse reflective particles, white particles, black particles, colored particles, and dye molecules, and wherein the material and shell material differ in one or more optical properties selected from the group of color, reflectivity, type of reflectivity, and absorption of light.

As indicated above, it appears that with the core-shell structure, enhanced optical properties can be obtained. For instance, specular reflective material in the shell may provide a more (specular) sparkling reflective appearance when diffuse reflective or light absorbing, light reflecting (may be colored and/or have diffuse light reflecting metallic appearance) material in the core is applied.

The 3D printed item may comprise a plurality of layers on top of each other, i.e. stacked layers. The width (thickness) and height of (individually 3D printed) layers may e.g. in embodiments be selected from the range of 100-5000 µm, such as 200-2500 µm, with the height in general being smaller than the width. For instance, the ratio of height and width may be equal to or smaller than 0.8, such as equal to or smaller than 0.6.

Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

Some specific embodiments in relation to the 3D printed item have already been elucidated below when discussing the method. Below, some specific embodiments in relation to the 3D printed item are discussed in more detail.

As indicated above, in embodiments the shell particles may comprise (specularly) reflective particles. Especially, in embodiments the shell particles comprise flake-like particles having a metal coating, especially an aluminum coating. Further, the flake-like particles may comprise (crystalline) polyethylene terephthalate. Alternatively or additionally, the shell particles may comprise solid flat metal particles with specular reflectivity. Alternatively or additionally, the shell particles may comprise glass particles coated with specularly reflecting metal. Alternatively or additionally, the shell particles may comprise mica particles coated with specularly reflecting metal. Alternatively or additionally, the shell particles may comprise holographic glitter particles. Yet further, additionally or alternatively the shell particles may comprise colored reflective particles. Hence, in embodiments the shell particles may comprise one or more of glitter particles selected from the group comprising particles with holographic grating and colored reflective particles. Hence, especially the shell particles are reflective.

As indicated above, in the shell individual shell particles (or clusters of them) may (essentially) homogeneously be distributed so that a spotty appearance may be provided.

In specific embodiments, wherein the shell particles have a particle length (L1) and a particle height (L2) with an aspect ratio of L1/L2 of at least 5. Alternatively or additionally, the shell particles have a particle width (L3) with an aspect ratio of L3/L2 of at least 5 (see also above). Further, in specific embodiments the one or more layers of the 3D printed material have a layer height (H), wherein the layer height (H) is larger than the particle length (L1), and wherein the layers are stacked.

In specific embodiments, the core additive material may comprise one or more of (i) diffusively reflecting particles and (ii) light absorbing particles, such as in embodiments black particles.

The shell may contain one or more of non-symmetric particles and symmetric particles such as spherical particles, irregularly shaped, etc. . . .

The size of the shell particles may be selected from the range of e.g. 2 µm-1 mm. In specific embodiments, dyes may be nano sized. Also pigments may be selected which are nano sized.

The (with the herein described method) obtained 3D printed item may be functional per se. For instance, the 3D printed item may be a lens, a collimator, a reflector, etc. . . . The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc. . . . The term optical component may also refer to a light source (like a LED). The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. . . . Alternatively, or additionally, the functional component may comprise a thermal component (e.g. configured to cool or to heat an electrical component). Hence, the functional component may be configured to generate heat or to scavenge heat, etc. . . .

As indicated above, the 3D printed item maybe used for different purposes. Amongst others, the 3D printed item maybe used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii) at least part of a wall of a lighting chamber, and (iii) a functional component, wherein the functional component may be selected from the group consisting of an optical component, a support, an electrically insulating component, an electrically conductive component, a thermally insulating component, and a thermally conductive component. Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc. . . . In embodiments, the 3D item may be configured as shade. A device or system may comprise a plurality of different 3D printed items, having different functionalities.

Especially, the shell particles may at least partly specularly reflect the light source light of the light source.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material, wherein the 3D printable material comprises core-shell 3D printable material comprising (i) a core comprising core material and (ii) a shell comprising shell material, wherein the core material comprises a core thermoplastic material and core additive material, wherein the shell material comprises a shell thermoplastic material and shell particles, wherein the shell material is light transmissive for one or more wavelengths in the visible wavelength range, and wherein the core material and shell material differ in one or more optical properties selected from the group of color, reflectivity, type of reflectivity, and absorption of light.

The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, wherein the 3D printable material comprises core-shell 3D printable material comprising (i) a core comprising core material and (ii) a shell comprising shell material, wherein the core material comprises a core thermoplastic material and core additive material, wherein the shell material comprises a shell thermoplastic material and shell particles, wherein the shell material is light transmissive for one or more wavelengths in the visible wavelength range, and wherein the core material and shell material differ in one or more optical properties selected from the group of color, reflectivity, type of reflectivity, and absorption of light.

Especially, the 3D printer comprises a controller (or is functionally coupled to a controller) that is configured to execute in a controlling mode (or "operation mode") the method as described herein. Instead of the term "controller" also the term "control system" (see e.g. above) may be applied. The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. . . . Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. . . . The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

As can be derived from the above, in aspects the invention provides a method for manufacturing a 3D item by means of fused deposition modelling, wherein the method comprises the step of layer-wise depositing an extrudate to provide the 3D item, wherein the extrudate comprises a core component and a shell component, wherein the core component is diffusely-reflective or light-absorptive, wherein the shell component is light-transmissive, and wherein the shell component comprises a thermoplastic shell material and specularly-reflective shell particles. In embodiments, the invention provides a method for producing a 3D item by means of fused deposition modelling, the method comprising a 3D printing stage comprising: layer-wise depositing an extrudate comprising 3D printable material, to provide the 3D item comprising 3D printed material, wherein the 3D item comprises a plurality of layers of 3D printed material, wherein the 3D printable material comprises core-shell 3D printable material comprising (i) a core comprising core material and (ii) a shell comprising shell material, wherein the core material comprises a core thermoplastic material and optionally core additive material, wherein the shell material comprises a shell thermoplastic material and shell particles, wherein the shell material is light transmissive for one or more wavelengths in the visible wavelength range, and wherein the core material and shell material differ in one or more optical properties selected from the group of color, reflectivity, type of reflectivity, and absorption of light. For instance, the shell particles may be specularly reflective, and the core material may be white or diffuse reflective. Suitable thermoplastic material may be selected for the core that may have the desirable properties. Especially, herein the core enhances contrast of the shell material (including particulate material). Hence, amongst others the invention provides FDM printed luminaires, or other items, with an enhanced shiny appearance. Hence, in specific embodiments the core component of the extrudate may be diffusely-reflective or light-absorptive. This may be achieved by using (i) a diffusely-reflective thermoplastic material, (ii) a light-absorptive thermoplastic material, (iii) a diffusely-reflective additive, such as diffusely-reflective particles, and/or (iv) a light-absorptive additive, such as light-absorptive particles, a pigment or a dye.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a-3b schematically depict some further aspects of the invention;

FIG. 4 schematically depicts a lamp or luminaire;

DETAILED DESCRIPTION OF THE EMBODIMENTS

Figure 1A:
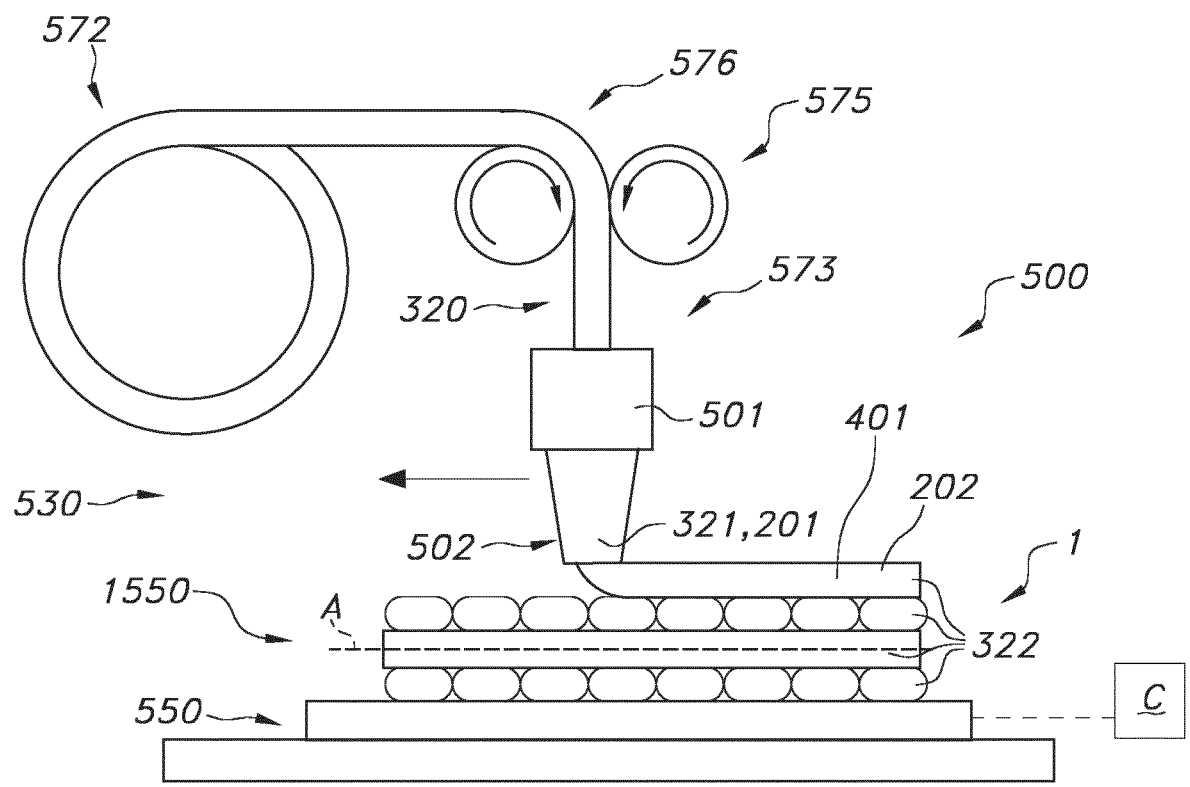
FIGS. 1a-1c schematically depict some general aspects of the 3D printer and of an embodiment of 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as an FDM 3D printer head is schematically depicted. Reference 501 indicates the printer head. The 3D printer of the present invention may especially include a plurality of printer heads (see below). Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below). Reference 321 indicates extrudate (of 3D printable material 201).

The 3D printer 500 is configured to generate a 3D item 1 by layer-wise depositing on a receiver item 550, which may in embodiments at least temporarily be cooled, a plurality of layers 322 wherein each layers 322 comprises 3D printable material 201, such as having a melting point $T_m$. The 3D printable material 201 may be deposited on a substrate 1550 (during the printing stage). By deposition, the 3D printable material 201 has become 3D printed material 202. 3D printable material 201 escaping from the nozzle 502 is also indicated as extrudate 321. Reference 401 indicates thermoplastic material.

The 3D printer 500 may be configured to heat the filament 320 material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in an extrudate 321 downstream of the printer nozzle which becomes a layer 322 on the receiver item or on already deposited printed material. In general, the diameter of the extrudate 321 downstream of the nozzle 502 is reduced relative to the diameter of the filament 322 upstream of the printer head 501. Hence, the printer nozzle is sometimes (also) indicated as extruder nozzle. Arranging layer 322 by layer 322 and/or layer 322*t* on layer 322, a 3D item 1 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
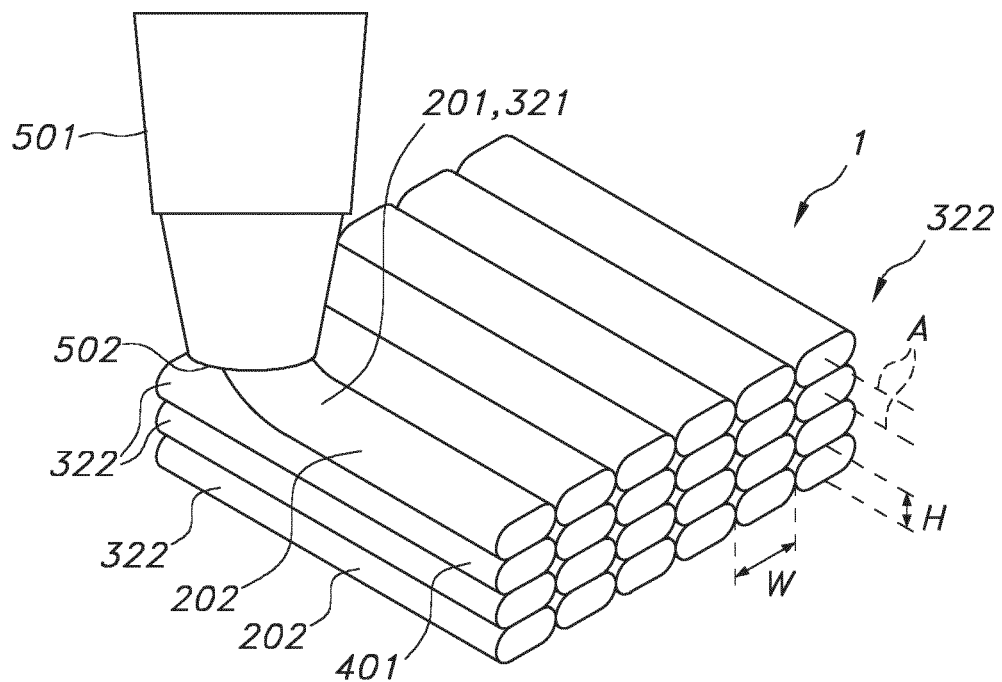

FIG. 1*b* schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 203. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1*a*-1*b* schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1*a*-1*b*, the first or second printable material or the first or second printed material are indicated with the general indications printable material 201 and printed material 202, respectively. Directly downstream of the nozzle 502, the filament 321 with 3D printable material becomes, when deposited, layer 322 with 3D printed material 202.

Figure 1C:
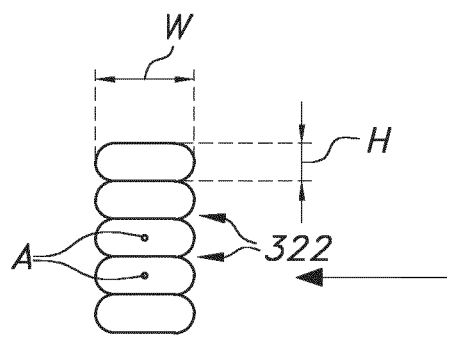

FIG. 1*c* schematically depicts a stack of 3D printed layers 322, each having a layer height H and a layer width W. Note that in embodiments the layer width and/or layer height may differ for two or more layers 322. Reference 252 in FIG. 1*c* indicates the item surface of the 3D item (schematically depicted in FIG. 1*c*).

Referring to FIGS. 1*a*-1*c*, the filament of 3D printable material that is deposited leads to a layer having a height H (and width W). Depositing layer 322 after layer 322, the 3D item 1 is generated.

Figure 2A:
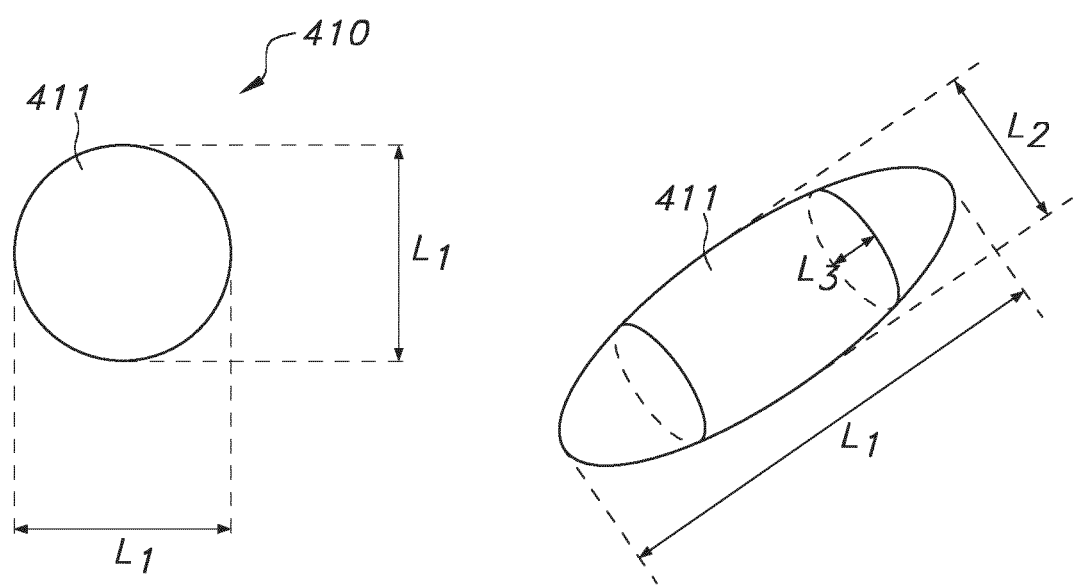
FIG. 2a-2f schematically depict some aspects of embodiments of particles, with some of the shapes being depicted for reference purposes.

FIG. 2*a* schematically depicts for the sake of understanding particles and some aspects thereof. Note that the particles used in the present invention are especially relative flat, see e.g. FIG. 2*d*, 2*e*.

The particles comprise a material 411, or may essentially consist of such material 411. The particles 410 have a first dimension or length L1. In the left example, L1 is essentially the diameter of the essentially spherical particle. On the right side a particle is depicted which has non spherical shape, such as an elongated particle 410. Here, by way of example L1 is the particle length. L2 and L3 can be seen as height and width. Of course, the particles may comprise a combination of differently shaped particles.

Figure 2B:
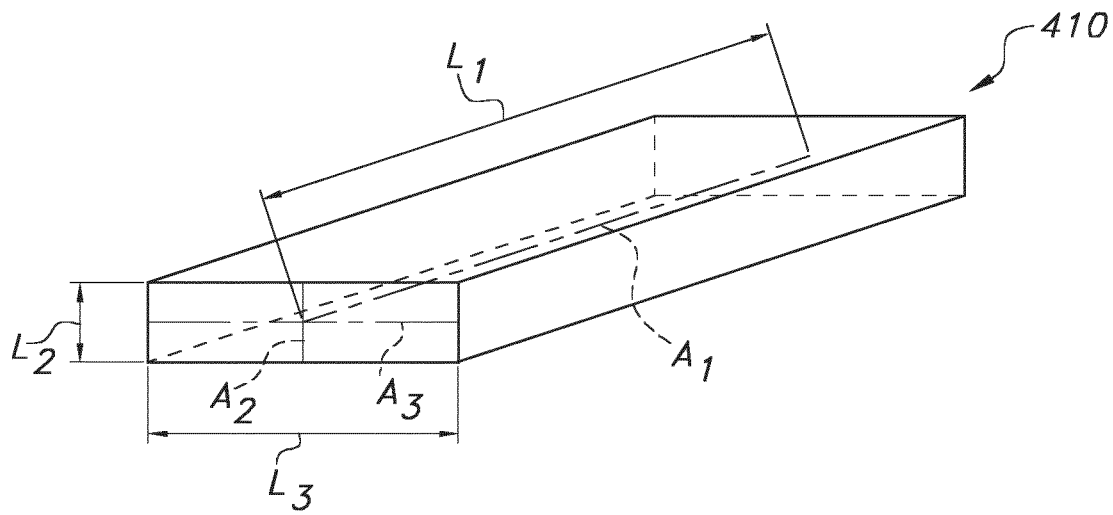

FIGS. 2*b*-2*f* schematically depict some aspects of the particles 410. Some particles 410 have a longest dimension Al having a longest dimension length L1 and a shortest dimension A2 having a shortest dimension length L2. As can be seen from the drawings, the longest dimension length L1 and the shortest dimension length L2 have a first aspect ratio larger than 1. FIG. 2*b* schematically depicts a particle 410 in 3D, with the particle 410 having a length, height and width, with the particle (or flake) essentially having an elongated shape. Hence, the particle may have a further (minor or main) axis, herein indicated as further dimension A3. Essentially, the particles 410 are thin particles, i.e. L2<L1, especially L2<<L1, and L2<<L3. L1 may e.g. be selected from the range of 5-200 µm; likewise L3 may be. L2 may e.g. be selected from the range of 0.1-20 µm.

Figure 2C:
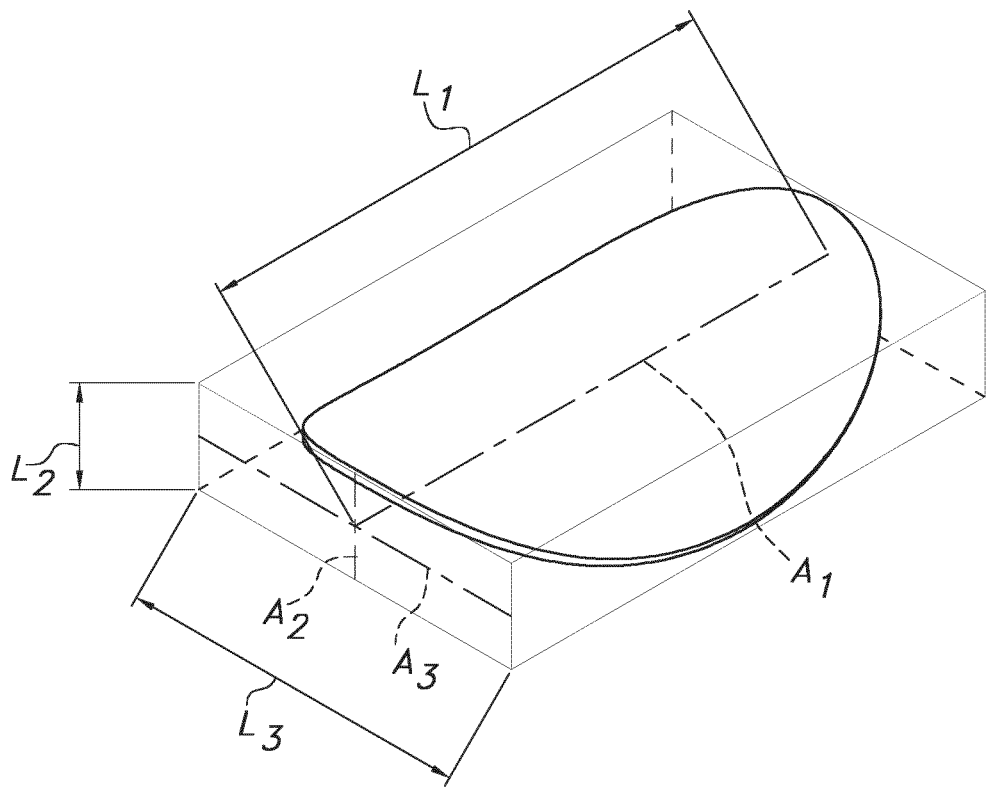

FIG. 2c schematically depicts a particle that has a less regular shape such as pieces of broken glass, with a virtual smallest rectangular parallelepiped enclosing the particle.

Note that the notations L1, L2, and L3, and A1, A2 and A3 are only used to indicate the axes and their lengths, and that the numbers are only used to distinguish the axis. Further, note that the particles are not essentially oval or rectangular parallelepiped. The particles may have any shape with at least a longest dimension substantially longer than a shortest dimension or minor axes, and which may essentially be flat. Especially, particles are used that are relatively regularly formed, i.e. the remaining volume of the fictive smallest rectangular parallelepiped enclosing the particle is small, such as less than 50%, like less than 25%, of the total volume.

Figure 2D:
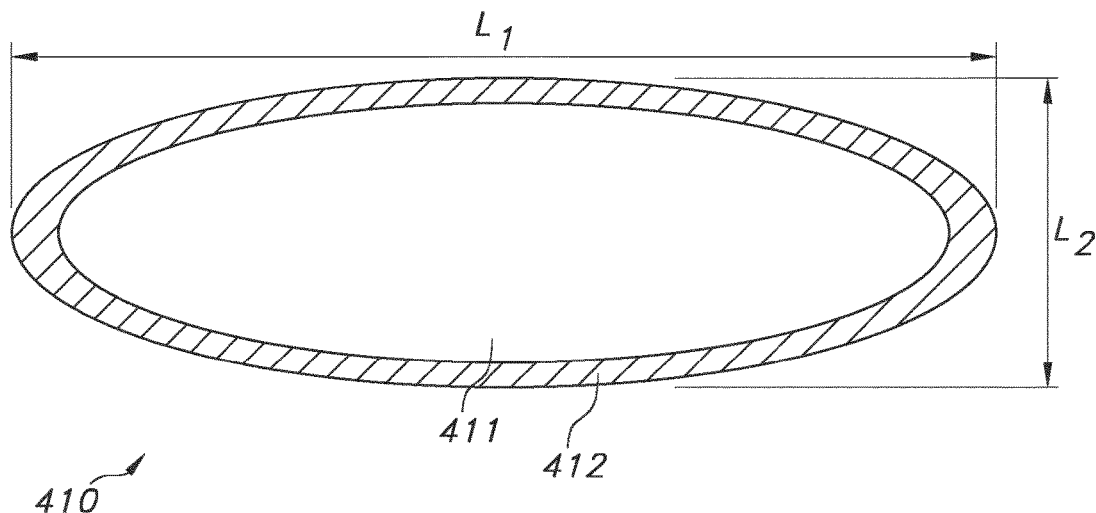

FIG. 2d schematically depicts in cross-sectional view a particle 410 including a coating 412. The coating may comprise light reflective material. For instance, the coating may comprise a (white) metal oxide. In other embodiments, the coating may essentially consist of a metal, such as an Ag coating. In other embodiments the coatings may only be on one or both of the large surfaces and not on the thin side surfaces of the particles.

Figure 2E:
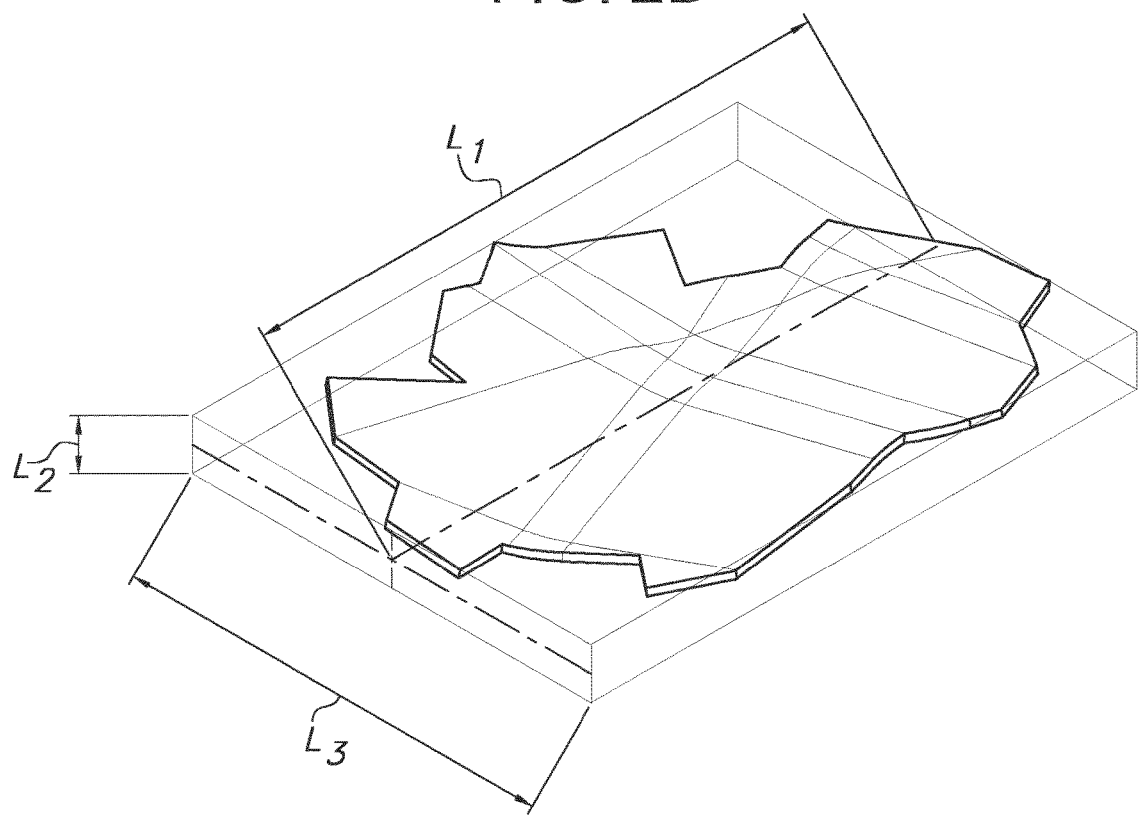

FIG. 2e schematically depicts a relatively irregularly shaped particle. The particulate material that is used may comprise e.g. small broken glass pieces. Hence, the particulate material that is embedded in the 3D printable material or is embedded in the 3D printed material may include a broad distribution of particles sizes. A rectangular parallelepiped can be used to define the (orthogonal) dimensions with lengths L1, L2 and L3.

Figure 2F:
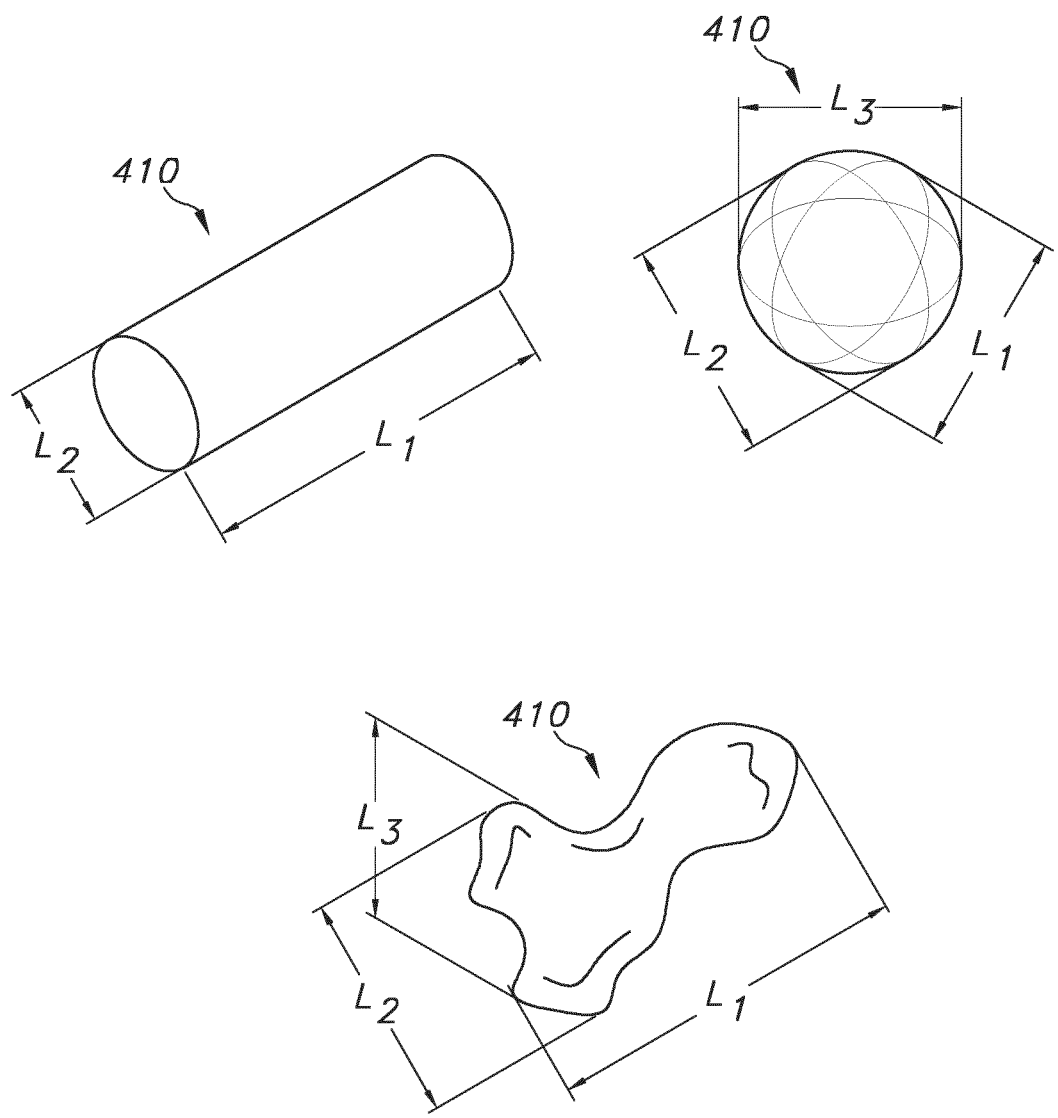

FIG. 2f schematically depicts cylindrical, spherical, and irregularly shaped particles, which will herein in general not be used (see also above).

As shown in FIGS. 2b-2f the terms "first dimension" or "longest dimension" especially refer to the length L1 of the smallest rectangular cuboid (rectangular parallelepiped) enclosing the irregular shaped particle. When the particle is essentially spherical the longest dimension L1, the shortest dimension L2, and the diameter are essentially the same.

FIG. 3a schematically depicts a filament 321, such as when escaping from a printer nozzle (not depicted), which comprises 3D printable material 201. The 3D printable material comprise thermoplastic material 401 with particles 410 embedded therein.

FIG. 3b schematically depicts a 3D item 1, showing the ribbed structures (originating from the deposited filaments), having heights H. This height may also be indicated as width. Here, layers 322 with printed material 202, with heights H and widths W are schematically depicted. FIG. 3b can be seen as a stack of layers 322 of which a plurality adjacent stacks are shown in FIG. 1b.

FIG. 4 schematically depicts an embodiment of a lamp or luminaire, indicated with reference 2, which comprises a light source 10 for generating light 11. The lamp may comprise a housing or shade or another element, which may comprise or be the 3D printed item 1. Here, the half sphere (in cross-sectional view) schematically indicates a housing or shade. The lamp or luminaire may be or may comprise a lighting device 1000 (which comprises the light source 10). Hence, in specific embodiments the lighting device 1000 comprises the 3D item 1. The 3D item 1 may be configured as one or more of (i) at least part of a lighting device housing, (ii) at least part of a wall of a lighting chamber, and (iii) an optical element. Hence, the 3D item may in embodiments be reflective for light source light 11 and/or transmissive for light source light 11. Here, the 3D item may e.g. be a housing or shade. The housing or shade comprises the item part 400. For possible embodiments of the item part 400, see also above.

Figure 5A:
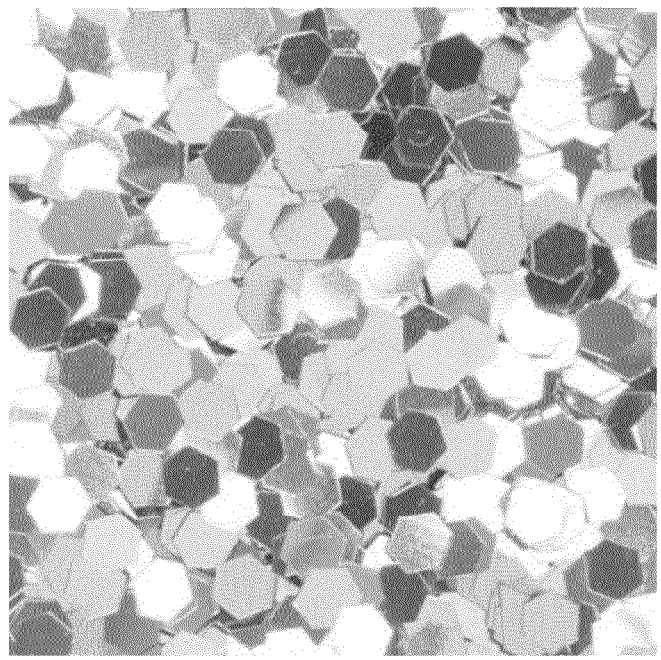
FIG. 5a-e shows examples of particles.
Figure 5B:
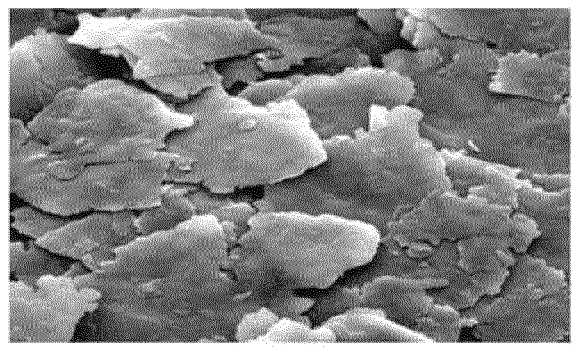
Figure 5C:
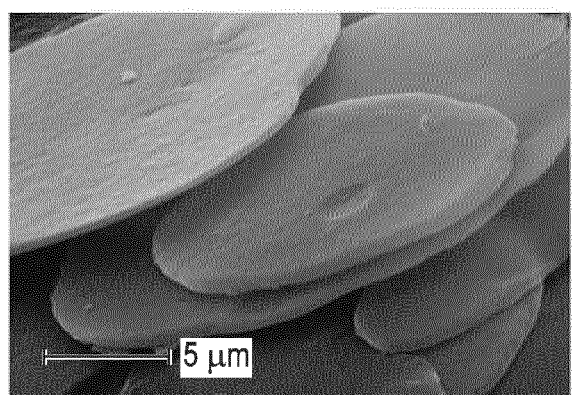
Figure 5D:
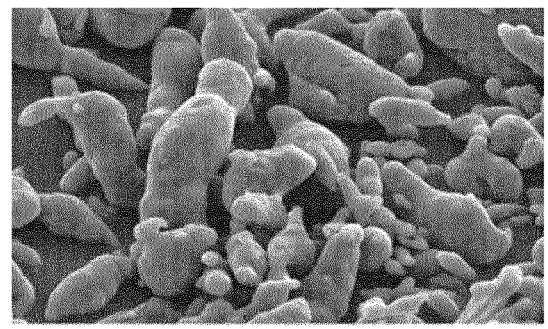
Figure 5E:
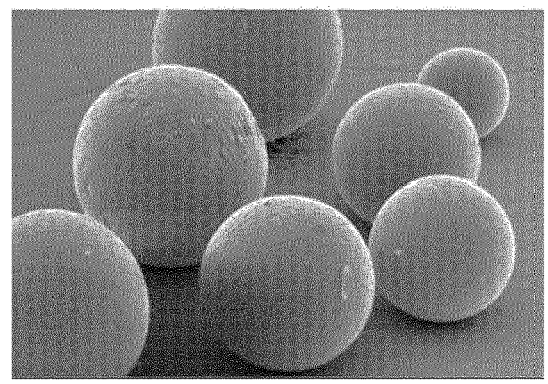

FIG. 5a schematically depicts an embodiment of glitters cut into hexagonal shape. They are cut from 12 and 25 µm thick (polyester) foils metalized with aluminum coating (e.g. in the range of about 10-60 nm). They can in embodiments size from about 50 µm up to 3 mm (L1, see also FIG. 2e). FIG. 5b depicts embodiments of (conventional) cornflake type particles. FIG. 5c depicts embodiments dollar-shaped particles. FIG. 5d depicts embodiments of irregularly shaped particles. FIG. 5e depicts embodiments of essentially spherical particles. The particles may e.g. be metal particles, or glass particles or polymer particles or mica particles coated with a metal coating, such as Al or Ag (or Cu), or coated with a metal oxide coating, etc.

Figure 6A:
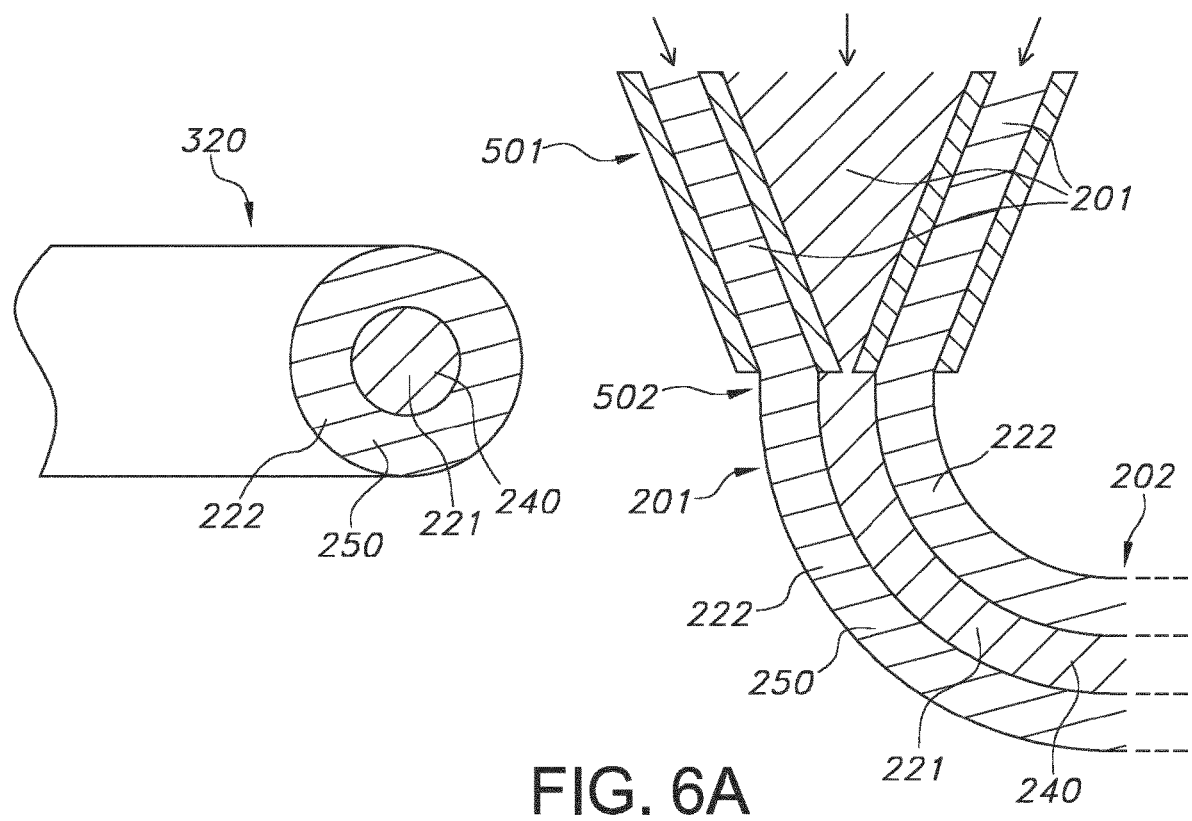
FIGS. 6a-6c schematically depict some further aspects.

FIG. 6a very schematically depicts on the left a filament 322, here a core-shell filament, which can be used for 3D printing with a simple nozzle. The core-shell filament 322 comprises a core 221 comprising core material 240 and a shell 222 comprising shell material 250.

Figure 6B:
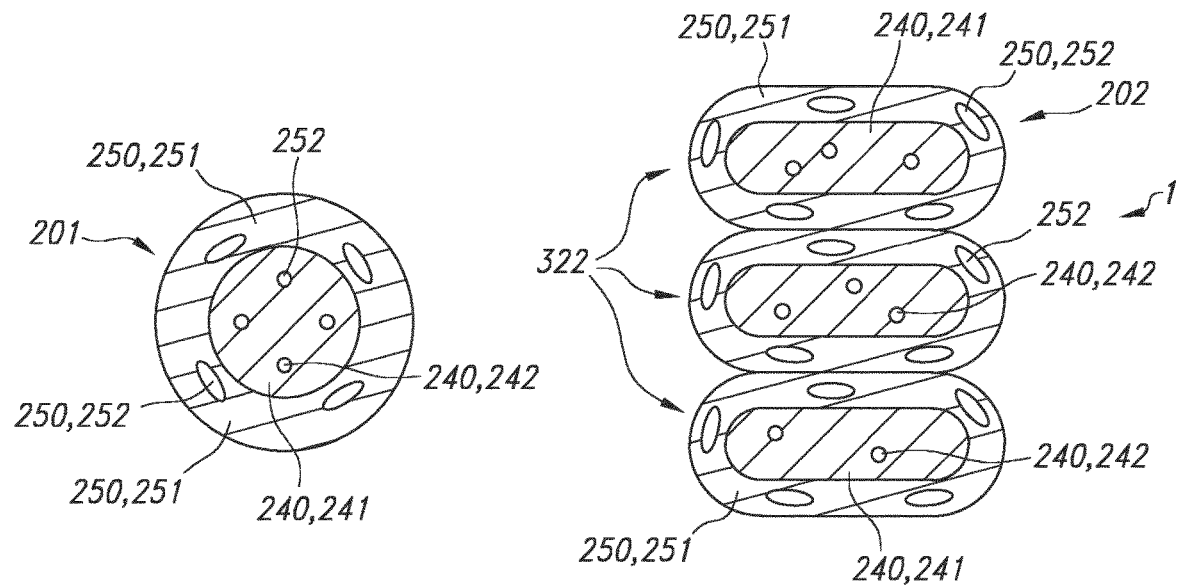

FIG. 6b on the right shows a nozzle 502, here a core-shell nozzle 502, which may be used to extrude 3D printable material that has a core-shell structure. Hence, in such embodiments filaments may be used as input material that are not of the type-core shell, as the core-shell structure is created with the nozzle 502.

FIG. 6b schematically depicts on the left a cross-section of the core-shell filament 322, such as schematically depicted on the left in FIG. 5a. The core material 240 comprises a core thermoplastic material 241 and core additive material 242. The shell material 250 comprises a shell thermoplastic material 251, which may or may not be different from the thermoplastic material 241 of the core 221, and shell particles 252. The shell material 250 is light transmissive for one or more wavelengths in the visible wavelength range. Further, the core material 240 and shell material 250 differ in one or more optical properties selected from the group of color, reflectivity, type of reflectivity, and absorption of light. In specific embodiments, the core additive material and shell particles may differ in one or more optical properties selected from the group of color, reflectivity, type of reflectivity, and absorption of light. Even more especially, in embodiments the core particles and shell particles differ in one or more optical properties selected from the group of color, reflectivity, type of reflectivity, and absorption of light.

Such (core-shell) filament 322 may be extruded to provide core-shell layers, see e.g. also FIG. 6a). Hence, it is also possible to use filaments which are made of core shell layers. In such embodiments, the printer head may have a single nozzle (i.e. not of the core-shell type).

FIG. 6b on the right very schematically depicts in more detail an embodiment of a 3D item 1 comprising 3D printed material 202. The 3D item 1 comprises a plurality of layers 322 of 3D printed material 202. The 3D printed material 202 comprises core-shell 3D printed material 202 comprising a core 221 comprising core material 240 and a shell 222 comprising shell material 250. The core material 240 comprises a core thermoplastic material 241 and core additive material 242. The shell material 250 comprises a shell thermoplastic material 251 and shell particles 252. The shell material 250 is light transmissive for one or more wavelengths in the visible wavelength range. The core additive material, such as core particles 242, and shell particles 252 differ in one or more optical properties selected from the group of color, reflectivity, type of reflectivity, and absorption of light. In specific embodiments, the shell particles 252 comprise specularly reflective particles.

Figure 6C:
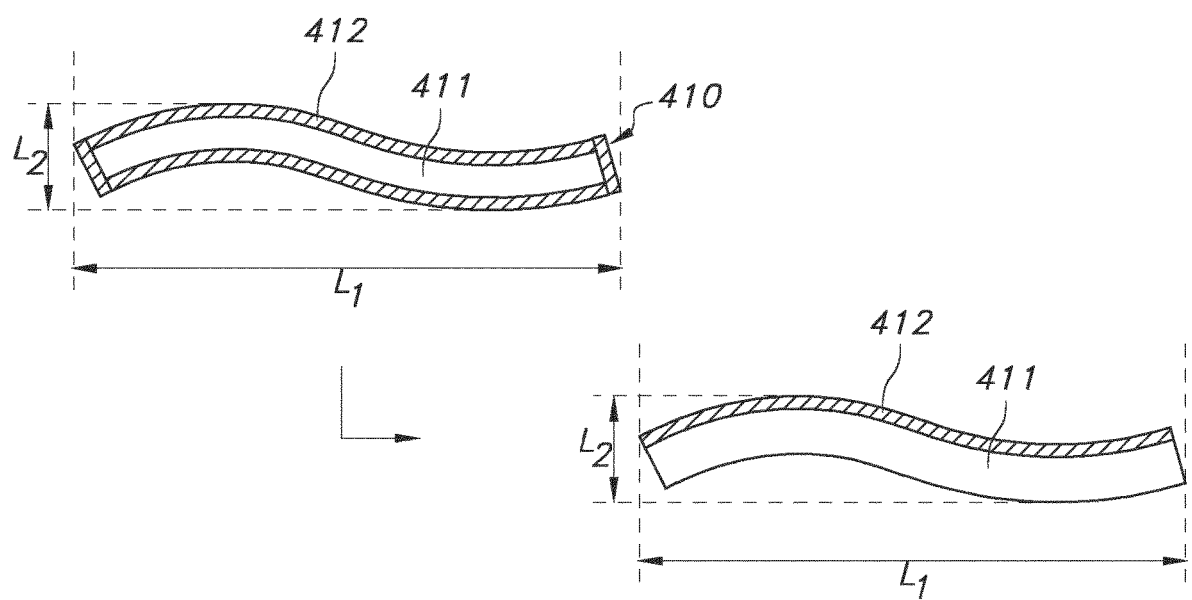

Referring to FIG. 6c, in embodiments the dopant material 410 comprises polymeric flake-like particles having a metal coating. Reference 411 indicate support material, such as the polymeric material, like e.g. (biaxially oriented) PET film, and reference 412 indicates coating material, such as aluminum. Hence, in embodiments the dopant material 410 comprises polyethylene terephthalate flake-like particles having an aluminum coating can be applied. As schematically depicted, the metal coating may be only on one side, but may also be conformal.

Referring to e.g. FIG. 6c, the dopant material 410 comprises may polymeric flake-like particles having a metal coating, especially wherein the dopant material 410 comprises polyethylene terephthalate flake-like particles having an aluminum coating, wherein the flake-like particles have a particle length L1 and a particle height L2 with an aspect ratio of L1/L2 of at least 5, wherein the layers 322 of one or more of the 3D printed material 202 have a layer height H, wherein the layer height H is smaller than the particle length L2. In alternative embodiments, the layer height H may be larger than the particle length L2.

Such dopant material 410 as depicted in FIG. 6c may be used as e.g. shell particles 252.

For obtaining metallic appearance use of metal flakes have been suggested. Commercially available aluminum flakes are so-called corn flakes with an irregular shape or so-called dollar flakes which are round. However, these flakes have rough surfaces and when printed they look rather gray without any specular reflecting component. In order to obtain more metallic appearance specularly reflecting flake particles with a smooth surface such as metal glitters can be used. Such glitters are particles of precision cut out of metal sheets such as aluminum and have shapes such as hexagon, rectangle etc. As opposed to metal flakes with a dollar and cornflake shaped particles produced by flattening spherical or irregularly shaped metal particles respectively, these pure metal glitters show specular reflection and have a shiny appearance. They differ from glitters where sub-micron thick aluminum layer is deposited on a polymeric carrier as they can be processed at elevated temperatures such that they can be included in polymers such as polycarbonate with ease. Pure metal glitters have a thickness of at least 2 micrometer and length-width dimensions of at least 50×50 micrometer. It is also possible to use glass flakes coated with silver/aluminum. It was observed that when these pure aluminum metal glitters and/or specularly reflecting glass flakes are used in a mixture with flakes which show only diffuse reflection an enhanced metallic look is obtained. In this ID we propose the use of a mixture of diffuse and specularly reflecting particles to obtain surfaces with a shiny appearance. The shiny sparkling appearance is enhanced when polymer carrying the particles are physically separated. For example, they can also be extruded as core jacket configuration where the jacket is made of a transparent polymer comprising pure metal glitters while the core is made of a polymer with diffuse reflecting metal flakes to obtain a further enhanced metallic look. In such a core shell configuration glass flakes or glitters can be used in combination with another reflective or absorbing layers to create decorative effects. The thickness of the jacket with reflective particles is preferably 10-500 μm and the light transmission through this layer is preferably 60-95% where the individual specularly reflecting particles or clusters of such particles are dispersed in the jacket.

Figure 7A:
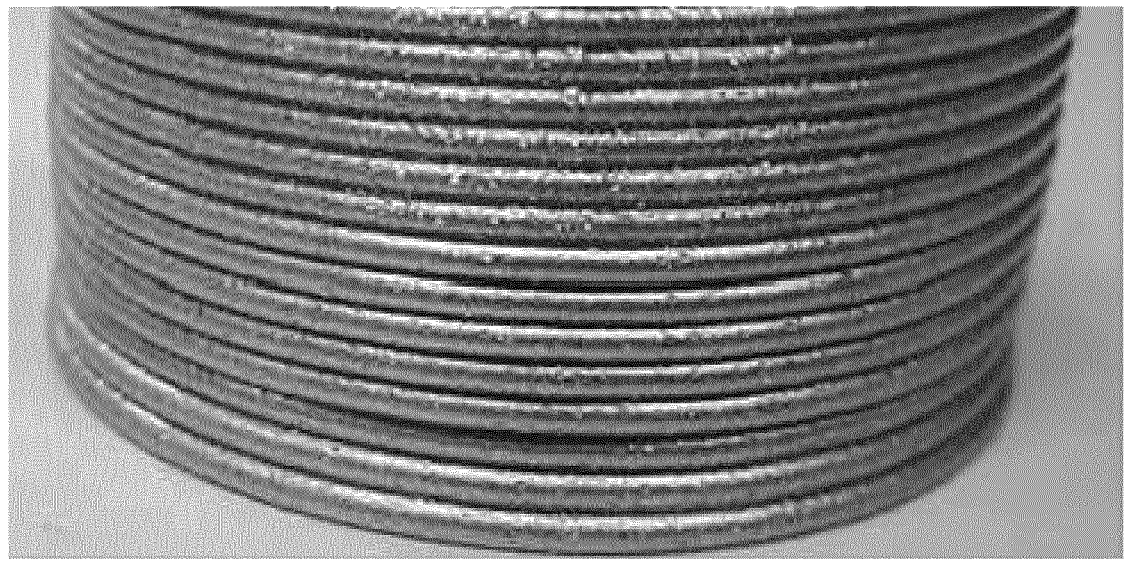
FIGS. 7a-7c show photographs of examples made. The schematic drawings are not necessarily to scale.
Figure 7B:
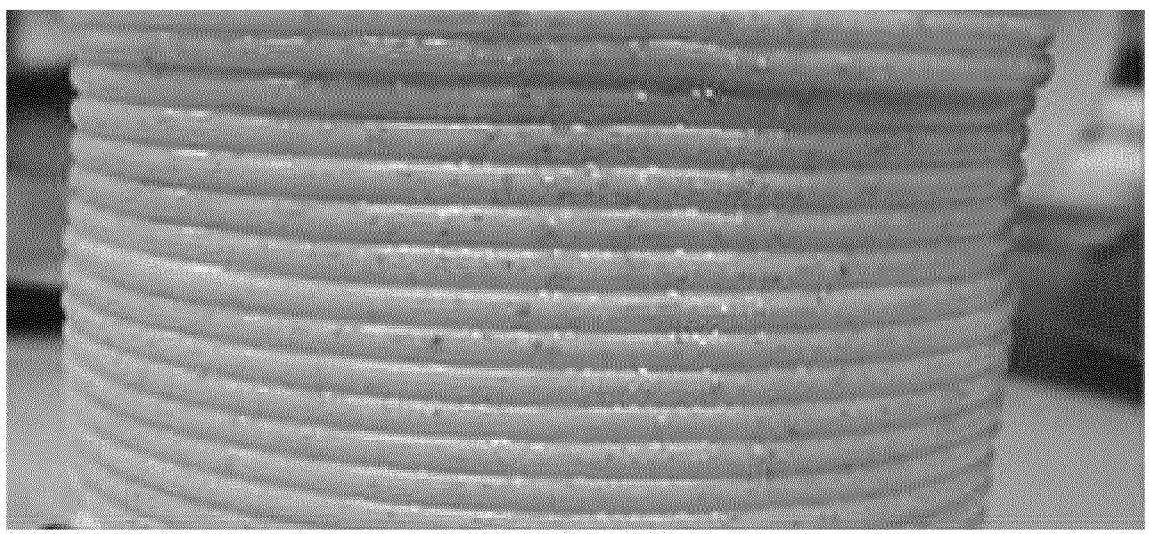
Figure 7C:
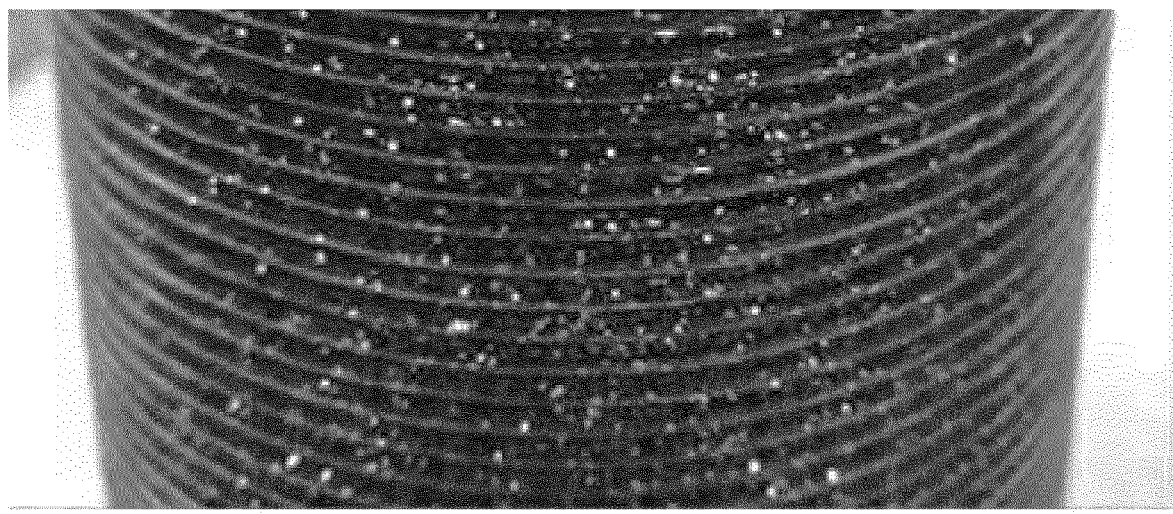

We produced cylindrical objects comprising specularly reflecting metal glitters in the jacket and various materials in the core. In an example, specularly reflecting metal particles in the jacket and diffuse reflecting metallic particles in the core were applied. In another example, specularly reflecting particles in the jacket and diffuse white reflecting polymer in the core. In yet another example, specularly reflecting particles in the jacket and black absorbing polymer in the core. FIG. 7a shows specularly reflecting metal particles in the jacket (shell) and diffuse reflecting metallic particles in the core. FIG. 7b shows specularly reflecting particles in the jacket and diffuse white reflecting polymer in the core. FIG. 7c shows specularly reflecting particles in the jacket and black absorbing polymer in the core Specularly reflecting particles in the jacket gave sparkling decorative appearance to the objects. In combination with diffuse reflecting particles in the core gave more metallic appearance to the printed objects. When black core is combined with diffuse reflecting particles white particles were used in the shell or the other way around decorative and attractive surfaces can be created.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for producing a 3D item by means of fused deposition modelling, the method comprising a 3D printing stage comprising: layer-wise depositing an extrudate comprising 3D printable material, to provide the 3D item comprising 3D printed material, wherein the 3D item comprises a plurality of layers of the 3D printed material, wherein the 3D printable material comprises core-shell 3D printable material comprising (i) a core comprising core material and (ii) a shell comprising shell material, wherein the core material comprises a core thermoplastic material and core additive material, wherein the shell material comprises a shell thermoplastic material and shell particles, wherein the shell material is light transmissive for one or more wavelengths in the visible wavelength range, wherein the shell particles comprise specularly reflective particles, wherein the core additive material comprises one or more of diffuse reflective particles, white particles, black particles, colored particles, and dye molecules, and wherein the core material and the shell material differ in one or more optical properties selected from the group of color, reflectivity, type of reflectivity, and absorption of light.

2. The method according to claim 1, wherein the shell particles comprise one or more of (i) polymeric flake-like particles having a metal coating or a metal oxide coating, (ii) glass flakes having a metal coating or a metal oxide coating, (iii) metal flakes, (iv) mica particles having a metal coating or a metal oxide coating, (v) holographic glitter particles, and (vi) colored reflective particles, wherein the method further comprises using a core-shell filament of 3D printable material or using a core-shell nozzle for creating the extrudate.

3. The method according to claim 1, wherein the shell particles comprise polyethylene terephthalate flake-like particles having an aluminum coating.

4. The method according to claim 1, wherein the shell particles have a particle length (L1), a particle height (L2), and a particle width (L3) with an aspect ratio of L1/L2 of at least 5, and L3/L2 of at least 5, and wherein the method comprises printing one or more layers of the 3D printed material having a layer height (H), wherein the layer height (H) is larger than the particle length (L1), and wherein the layers are stacked.

5. The method according to claim 4, wherein the shell particles have one or more dimensions selected from the particle length (L1), the particle height (L2), and the particle width (L3), having a length selected from the range of equal to or larger than 2 μm and equal to or smaller than 5 mm.

6. The method according to claim 1, wherein the core additive material comprises one or more of (i) diffuse reflective particles and (ii) light absorbing particles.

7. The method according to claim 1, wherein the core additive material comprises metal particles, wherein the metal particles are wrinkled, and/or wherein the metal particles have a diffuse reflecting surface.

8. The method according to claim 1, wherein the 3D printable material and the 3D printed material comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), semi-crystalline polyethylene terephthalate (PET), acrylonitrile butadiene styrene (ABS), poly(methyl methacrylate) (PMMA), polystyrene (PS), and styrene acrylic copolymers (SMMA).

9. A core-shell filament comprising (i) a core comprising core material and (ii) a shell comprising shell material, wherein the core material comprises a core thermoplastic material and core additive material, wherein the shell material comprises a shell thermoplastic material and shell particles, wherein the shell material is light transmissive for one or more wavelengths in the visible wavelength range, wherein the shell particles comprise specularly reflective particles, wherein the core additive material comprises one or more of diffuse reflective particles, white particles, black particles, colored particles, and dye molecules, and wherein the core material and shell material differ in one or more optical properties selected from the group of color, reflectivity, type of reflectivity, and absorption of light.

10. A 3D item comprising 3D printed material, wherein the 3D item comprises a plurality of layers of the 3D printed material, wherein the 3D printed material comprises core-shell 3D printed material comprising (i) a core comprising core material and (ii) a shell comprising shell material, wherein the core material comprises a core thermoplastic material and core additive material, wherein the shell material comprises a shell thermoplastic material and shell particles, wherein the shell material is light transmissive for one or more wavelengths in the visible wavelength range, wherein the shell particles comprise specularly reflective particles, wherein the core additive material comprises one or more of diffuse reflective particles, white particles, black particles, colored particles, and dye molecules, and wherein the core material and shell material differ in one or more optical properties selected from the group of color, reflectivity, type of reflectivity, and absorption of light.

11. The 3D item according to claim 10, wherein the shell particles comprise polyethylene terephthalate flake-like particles having metal coating or a metal oxide coating, wherein the shell particles have a particle length (L1) and a particle height (L2) with an aspect ratio of L1/L2 of at least 5, and wherein the plurality of layers of the 3D printed material have a layer height (H), wherein the layer height (H) is larger than the particle length (L1), and wherein the layers are stacked.

12. The 3D item according to claim 10, wherein the core additive material comprises one or more of (i) diffuse reflective particles and (ii) light absorbing particles.

13. A lighting device comprising a light source and the 3D item according to claim 10, wherein the 3D item is configured as one or more of (i) at least part of a lighting device housing, (ii) at least part of a wall of a lighting chamber, and (iii) an optical element.

* * * * *